Patented Apr. 3, 1923.

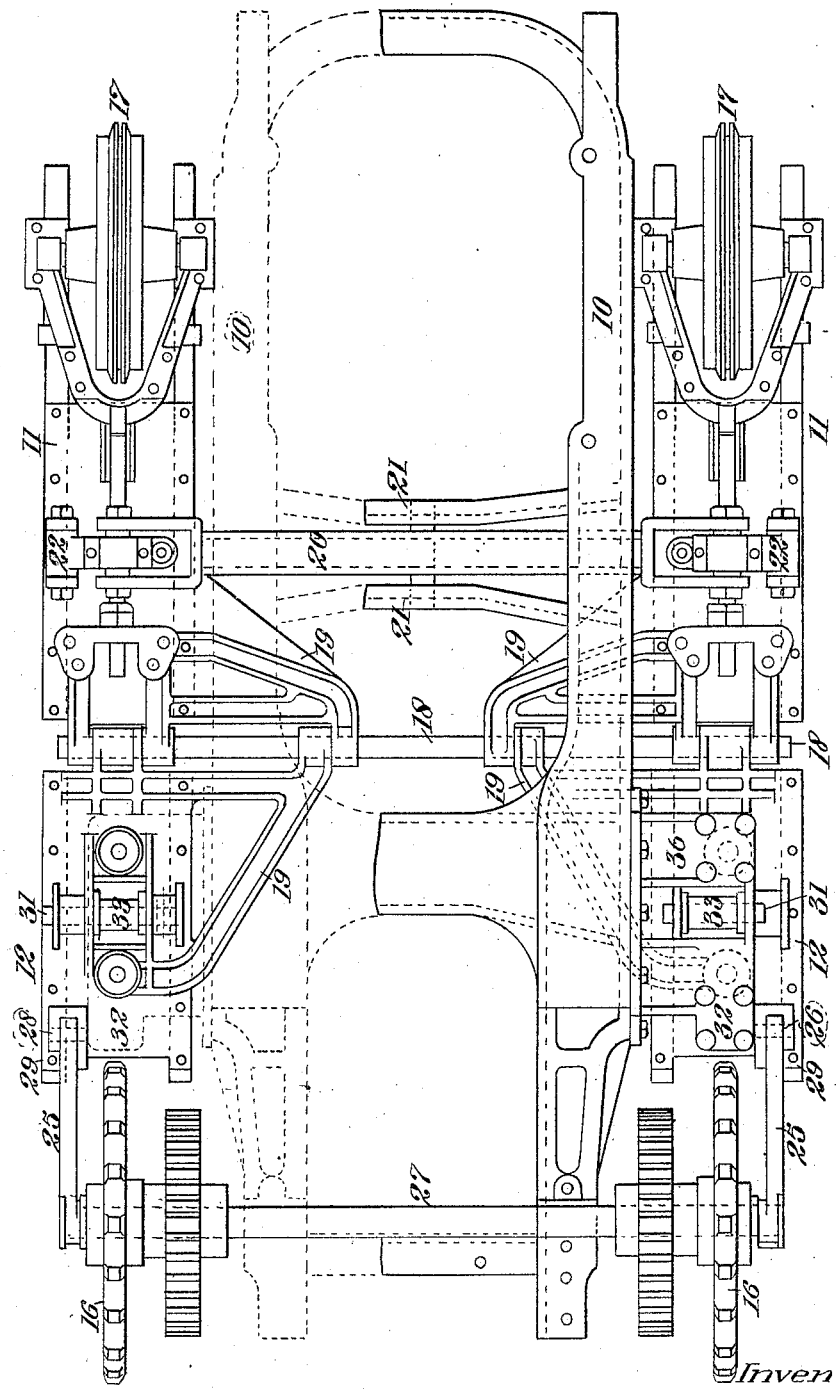

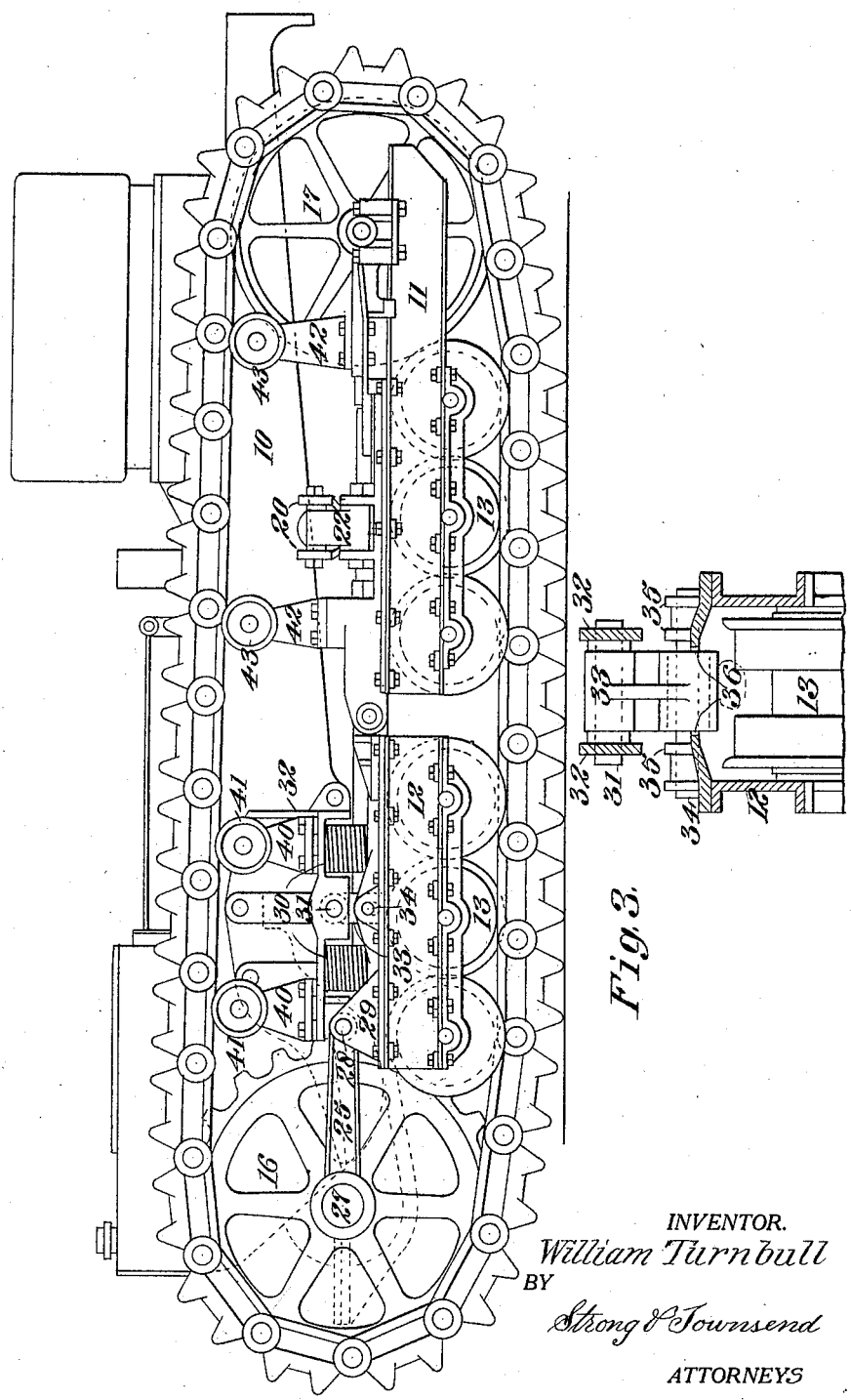

1,450,465

UNITED STATES PATENT OFFICE.

WILLIAM TURNBULL, OF PEORIA, ILLINOIS, ASSIGNOR TO THE HOLT MANUFACTURING COMPANY, OF STOCKTON, CALIFORNIA, A CORPORATION OF CALIFORNIA.

CHAIN-TRACK TRACTOR.

Application filed May 25, 1918. Serial No. 236,523.

*To all whom it may concern:*

Be it known that I, WILLIAM TURNBULL, a citizen of the United States, residing at Peoria, in the county of Peoria and State of Illinois, have invented new and useful Improvements in Chain-Track Tractors, of which the following is a specification.

This invention relates to chain track tractors and vehicles of the chain track variety, and pertains especially to the manner of mounting the main frame on the trucks; reference being had particularly to constructions of the type represented in co-pending application Serial Number 164,945, filed April 27th, 1917, and application Serial Number 236,526, filed concurrently herewith.

In the first above mentioned applications an articulated truck is employed running on endless, self-laying tracks, with an angularly disposed thrust link connecting the articulations of the truck sections with the main frame.

In the present construction I dispense with the thrust link at the point of articulation, and while I still use a thrust link to maintain the proper position of the trucks, I employ a special form of spring mounting and means for pivoting the rear truck directly and loosely on the main frame so as to prevent the truck from falling away from the main frame when the vehicle bridges a ditch or depression.

Also in the present invention I provide for a three-point suspension of the main frame on the trucks of novel design and embodying, in part, the features of the latter mentioned application filed concurrently herewith. The invention also embodies means for guiding the upper run of the chain track, so that the forward section of track is supported directly on the forward truck section and the rear section of track, including the rear sprocket, is supported on the main frame.

Having reference to the accompanying drawings:

Fig. 1 illustrates the present invention as viewed in plan, particularly disclosing the truck construction and further illustrating the tractor frame partly in solid and partly in dotted lines.

Fig. 2 is a view in side elevation, illustrating a truck fitted with the construction with which the present invention is concerned.

Fig. 3 is a view in vertical section and elevation, as seen on the line 3—3 of Fig. 2.

10 indicates a tractor frame, here shown as of the cast unit type, which is adapted to be supported upon complementary load-bearing side trucks, each composed of front and rear sections 11 and 12 and provided with truck rollers 13 adapted to run on the rail sections of the endless chain tracks which pass around the drive sprocket 16 and a front idler 17. The drive sprocket 16 is mounted directly on the main frame, whilst the front idler 17 is adjustably mounted on the front end of the front truck section 11. The truck sections are jointed and hinged on a cross pivot rod 18 which extends freely beneath the main frame.

Brackets 19 extend inwardly from each of the respective truck sections and embrace the pivot rod 18 and maintain the truck sections in alignment and keep the trucks upright and in spaced relation to each other in a manner well known in the art.

The front end of the main frame is yieldingly supported on the forward truck sections by means of an equalizer bar 20, centrally fulcrumed between cross members 21 of the main frame; the ends of the equalizer bar being suitably connected with the said truck sections by universal shackles 22. The manner of mounting this equalizer bar and the shackle construction forms the subject-matter of the latter of said co-pending applications. It is considered here only in its generic aspect to the complete machine.

The rear truck sections 12 are maintained in suitably spaced relation to the rear sprocket 16 by means of thrust links 25 which pivot on the ends of the drive sprocket shaft 27 and their forward ends pivot on pins 28 in posts 29 on the truck sections 12. The rear end of the main frame is yieldingly supported on these rear truck sections by the springs 30, arranged in pairs on each side of a floating pivot 31. This pivot 31 is supported in an outrigger casting 32, bolted or otherwise suitably secured to the sides of the main frame, which outrigger casting 32 forms pads or seats to rest on the springs 31.

33 is a link which is hung on the pivot pin 31 and loosely connects with a pin 34 carried by spaced lugs 35 formed on the top, central portion of the rear truck sections 12. The hole in the link, through which the pin 34 passes, is elongated lengthwise of the link to allow the necessary vertical movement of the pin 34 in the natural rising and falling movement of the main frame on the springs 30. The object of this link and pin construction is to provide for the pivoting of the rear truck directly and loosely on the main frame and doing away with the angular thrust link heretofore used between the main frame and the point of articulation of the truck sections. This loose pivoting of the truck on the frame prevents the truck from falling away from the main frame in bridging a depression. It also takes care of side thrusts and keeps the truck lined up with the sprocket and track; it being observed that the link 33 is of considerable breadth so as to have an elongated bearing on its pins 31—34 and it also being noted that the link has a loose fit in the slot 36, formed in the top of the truck frame 12.

The outrigger casting 32, it will be observed, forms seats for brackets 40 which carry rollers 41 to support the portion of the upper run of the chain track which overlies the rear truck section. The forward portion of the upper run of the track is supported directly upon the front truck section 11 by standards 42 and rollers 43, so that as the front idler 17 is also mounted on the truck section 11, it will be seen that the track will partake of the rising and falling movements and undulations assumed by the forward truck sections 11. This will serve to maintain not only the proper alignment of the track at all times and proper tension, but it will relieve the track from unnecessary strains, as may be the case where the entire upper run of the track is supported directly on the main frame, without regard to the different positions assumed by the trucks with respect to the main frame.

The result of the foregoing construction is to provide a simple, practical, universal, yieldable, three-point suspension for the main frame and its load upon the truck sections, at the same time providing for the suspension of the truck sections from the main frame in case the vehicle is proceeding over rough and broken ground, thereby preventing the trucks from falling away from the main frame when the tension on the lower run of the chain track is temporarily removed. By carrying the rear set of rollers 41 upon the main frame and the front set of rollers 43 on the front truck the chain track is maintained at all times in its proper relation to the truck sections, irrespective of the jackknife action and other movements of the truck sections with respect to one another and with respect to the main frame.

It will be observed that the load is carried on the truck rollers 13 and not on the rear sprocket or front idler, except as might occur momentarily in mounting an abruptly inclined obstruction.

Having thus described my invention, what I claim and desire to secure by Letters Patent is—

1. In a vehicle, the combination of a main frame, a self-laying, endless, flexible track member at each side of the frame, articulated truck sections within each track member, a cross bar centrally pivoted to the main frame and pivoted at its ends to the front truck sections, a freely swinging link loosely pivoted to the rear portion of the main frame and to the rear truck section thereneath, and springs on each side of said link on which the load is yieldingly supported.

2. In a vehicle, the combination of a main frame and means to support the same, including an endless chain track, a jointed roller truck within the track with a front idler and a rear sprocket in alignment, and a link pivoted on the main frame and loosely connected with the truck to permit the latter to have a limited vertical movement with relation to the frame and capable of sustaining the rear truck section in the event the vehicle bridges a depression and the track drops away from the truck.

3. In a vehicle, the combination of a main frame and means to support the same, including an endless chain track, a jointed roller truck within the track with a front idler and a rear sprocket in alignment, a link pivoted on the main frame and loosely connected with the rear truck section to permit the latter to have a limited vertical movement with relation to the frame and capable of sustaining the truck in the event the vehicle bridges a depression and the track drops away from the truck, and spring supporting means between the frame and truck for yieldingly carrying the superposed load.

4. In a vehicle, the combination of a main frame, a jointed truck frame carrying rollers, a self-laying track upon which the rollers operate, a driving wheel for the track mounted upon the main frame, a carrying wheel for the track mounted upon the forward member of the truck frame, connecting means between the forward truck frame member and the main frame permitting vertical rocking movement of the truck frame member, a separate pivotal connection between the rear truck frame member and the main frame permitting limited rocking movement of said rear truck frame member, and a thrust link pivotally connected to the main frame and to the rear truck frame member for maintaining the latter in proper spaced relation to the track-driving wheel.

In testimony whereof I have hereunto set my hand in the presence of two subscribing witnesses.

WILLIAM TURNBULL.

Witnesses:
EMIL F. NORLINS,
H. B. BAKER.